(12) United States Patent
Wang

(10) Patent No.: US 8,898,954 B2
(45) Date of Patent: Dec. 2, 2014

(54) COMBINED GREENHOUSE

(76) Inventor: Hsi-Chin Wang, Tainan (TW)

( * ) Notice: Subject to any disclaimer, the term of this patent is extended or adjusted under 35 U.S.C. 154(b) by 572 days.

(21) Appl. No.: 13/328,475

(22) Filed: Dec. 16, 2011

(65) Prior Publication Data

US 2013/0152462 A1   Jun. 20, 2013

(51) Int. Cl.
*A01G 9/00* (2006.01)

(52) U.S. Cl.
USPC ............................................. 47/17

(58) Field of Classification Search
CPC .......................................... A01K 9/24
USPC .................. 47/17; 52/1, 63, 653.1; 454/221
See application file for complete search history.

*Primary Examiner* — Timothy D Collins
*Assistant Examiner* — Kathryn L Thompson
(74) *Attorney, Agent, or Firm* — William E. Pelton, Esq.; Cooper & Dunham LLP

(57) ABSTRACT

A combined greenhouse has a foundation bed, an outer wall assembly, a temperature control assembly, a roof and a plant bed. The foundation bed has multiple stands and a reinforcing device. The outer wall assembly is mounted on the foundation bed and has four walls and an outer frame. Each wall has a base frame and a transparent device. The outer frame is mounted outside the wall that is mounted on the front stand of the foundation bed. The temperature control assembly is mounted in the foundation bed and has a ventilating device, a water-wall device and an air-sucking device. The roof is mounted on the outer wall assembly and has multiple roof mounts. The plant bed is mounted on the reinforcing device and each has two end frames, at least one linking frame, a baseboard, a plant net and multiple resisting boards.

8 Claims, 18 Drawing Sheets

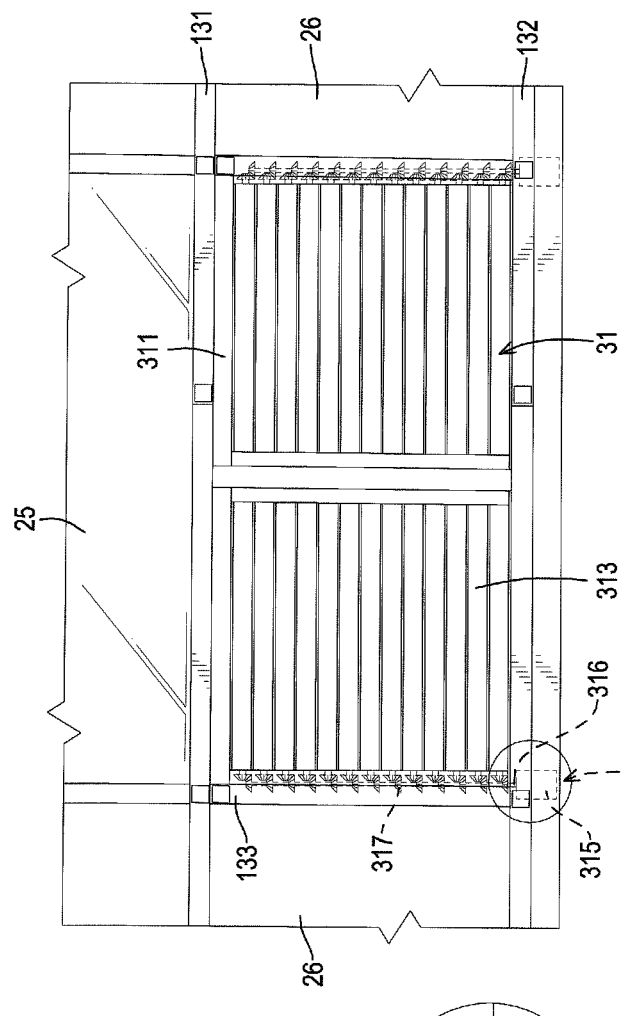
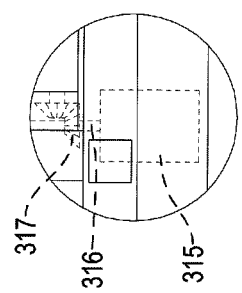

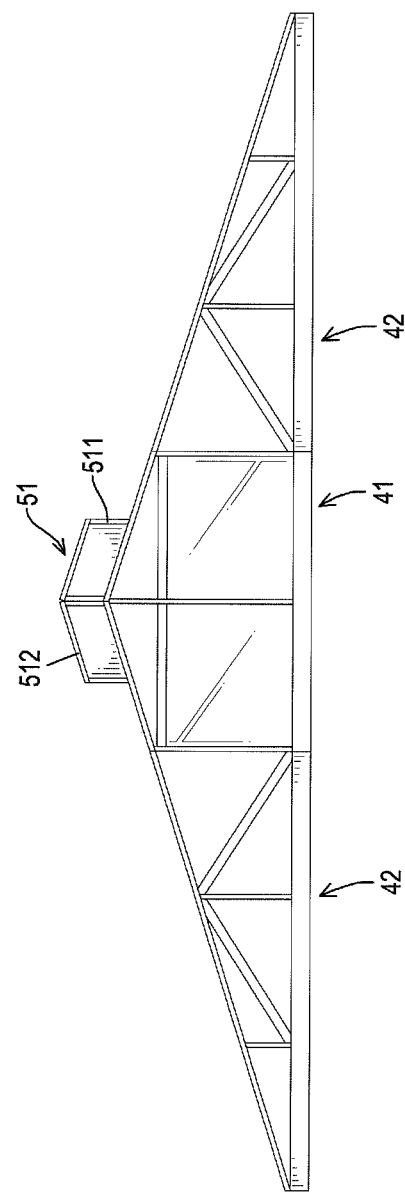

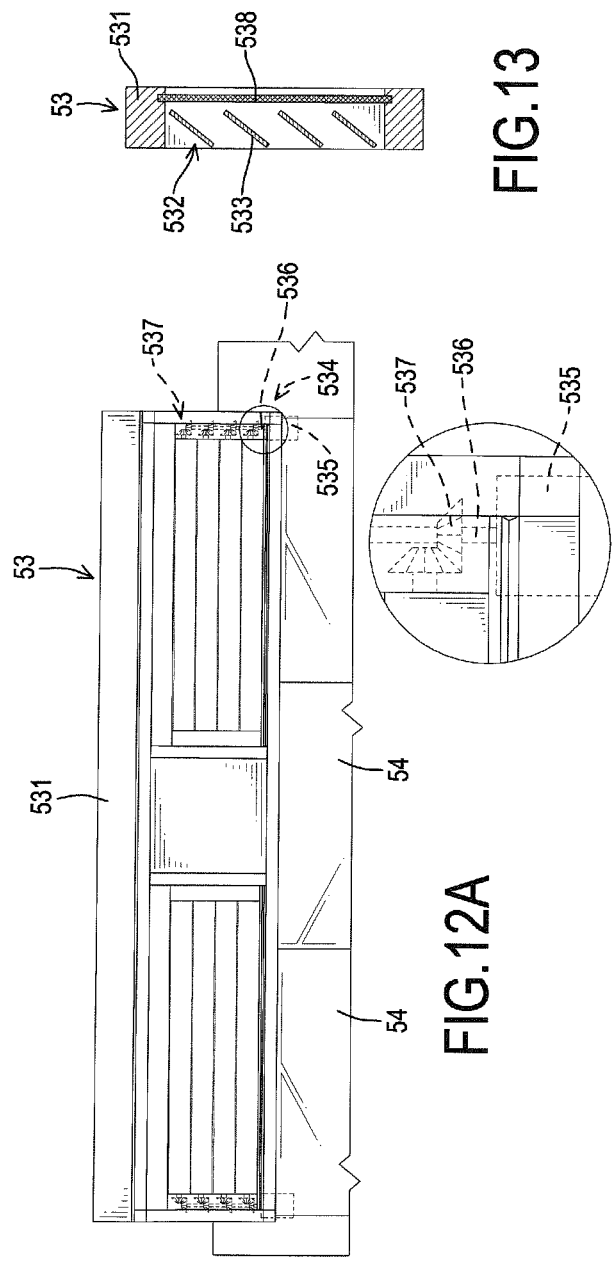

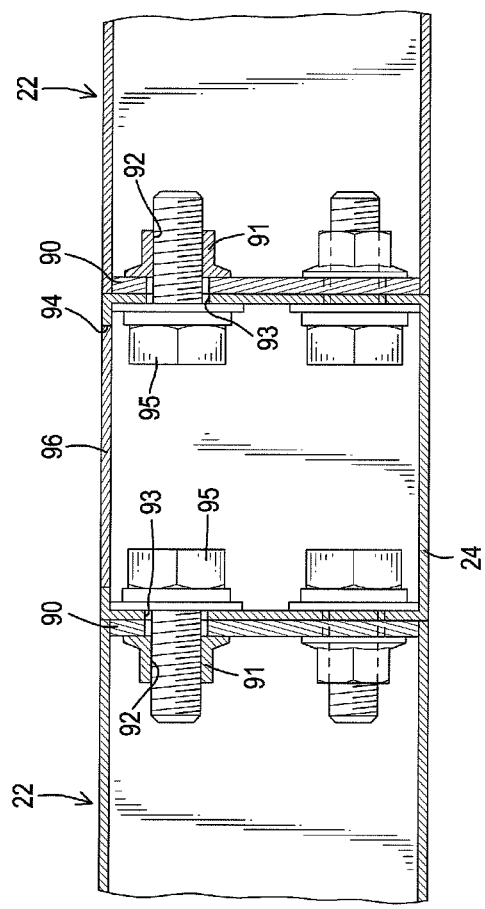

COMBINED GREENHOUSE

BACKGROUND OF THE INVENTION

1. Field of the Invention

The present invention relates to a greenhouse, and more particularly to a combined greenhouse that can be assembled quickly and easily to grow plants or to cultivate organisms.

2. Description of Related Art

Climate change will directly influence the agriculture and the aquaculture. Planting or cultivating in a conventional greenhouse can reduce the impact of climate change. According to the characteristics of the plants or the organisms, different kinds of conventional greenhouses are built.

The conventional greenhouse is designed to simulate the nature to grow plants or to cultivate organisms, is mounted with multiple glass windows to enable the sunshine to transmit into the conventional greenhouse and has a ventilating device to enable air to flow in the conventional greenhouse to adjust the temperature of the conventional greenhouse.

In order to increase the space of the conventional greenhouse to grow more plants or to cultivate more organisms, the pipes or studs of the conventional greenhouse are connected to each other by welding and this will consume a lot of time in assembling the conventional greenhouse. Furthermore, the large space of the conventional greenhouse will increase the costs for manufacturing and transporting the conventional greenhouse. In addition, the errors of the welding operation between the pipes or studs of the conventional greenhouse will affect the structural strength of the conventional greenhouse.

The combined greenhouse in accordance with the present invention mitigates or obviates the aforementioned problems.

SUMMARY OF THE INVENTION

The main objective of the present invention is to provide a combined greenhouse that can be used to grow plants or to cultivate organisms.

The combined greenhouse in accordance with the present invention has a foundation bed, an outer wall assembly, a temperature control assembly, a roof and a plant bed. The foundation bed has a front stand, a rear stand, two side stands and a reinforcing device. The outer wall assembly is mounted on the foundation bed and has four walls and an outer frame. The walls are respectively mounted on the stands of the foundation bed and each wall has a base frame and a transparent device. The outer frame is mounted outside the wall that is mounted on the front stand of the foundation bed and has an access door and a staircase. The temperature control assembly is mounted in one of the side stands and has a ventilating device, a water-wall device and an air-sucking device. The roof is mounted on the outer wall assembly above the foundation bed and has multiple roof mounts. The plant bed is mounted on the reinforcing device of the foundation bed and each plant frame has two end frames, at least one linking frame, a baseboard, a plant net and multiple resisting boards.

Other objectives, advantages and novel features of the invention will become more apparent from the following detailed description when taken in conjunction with the accompanying drawings.

BRIEF DESCRIPTION OF THE DRAWINGS

FIG. 8A is another enlarged side view of the temperature control assembly of the combined greenhouse in FIG. 6;

FIG. 8B is an enlarged side view of a driving module of the temperature control assembly of the combined greenhouse in FIG. 8A;

FIG. 11 is an enlarged side view of a roof mount and a ventilating room of the combined greenhouse in FIG. 1;

FIG. 12A is an enlarged side view of a ventilator of the ventilating room in FIG. 11;

FIG. 12B is an enlarged side view of a driving module of the ventilator of the ventilating room in FIG. 12A;

FIG. 13 is another enlarged cross sectional side view of the ventilator of the ventilating room in FIG. 11;

FIG. 19 is an enlarged side view in partial section of the wall of the combined greenhouse along line 19-19 in FIG. 5.

DETAILED DESCRIPTION OF THE PREFERRED EMBODIMENT

Figure 1:
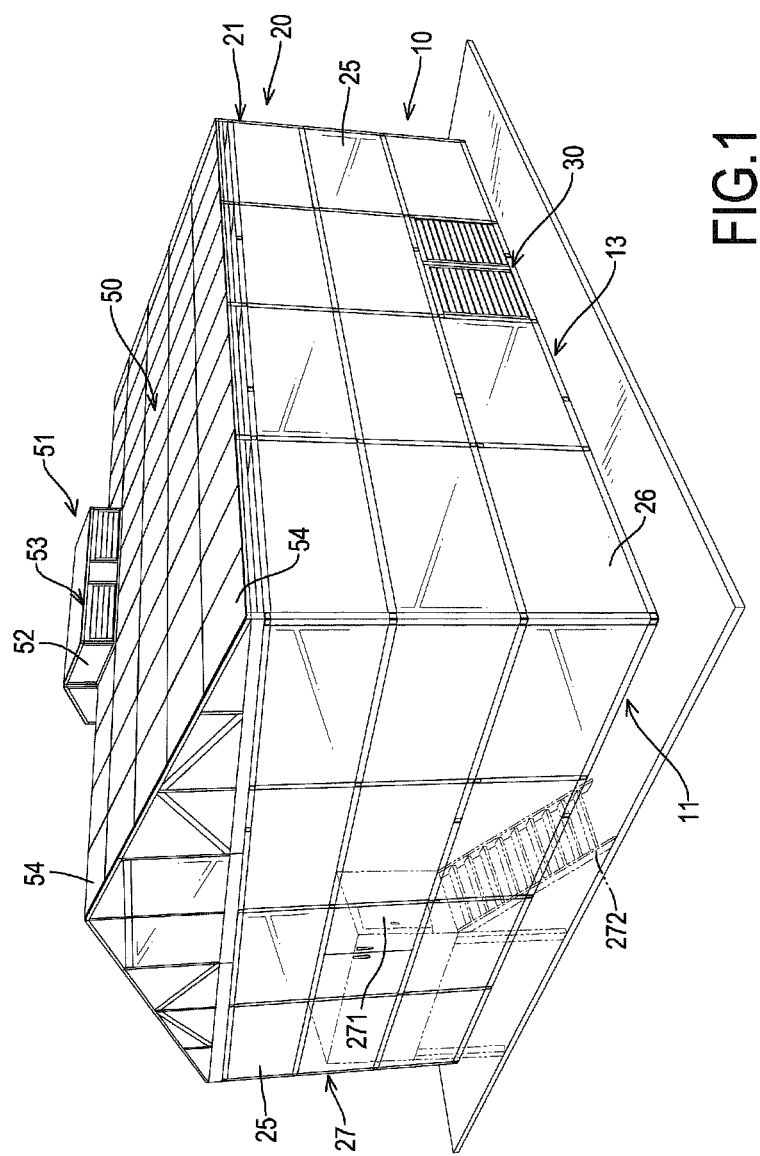
FIG. 1 is a perspective view of a combined greenhouse in accordance with the present invention.
Figure 2:
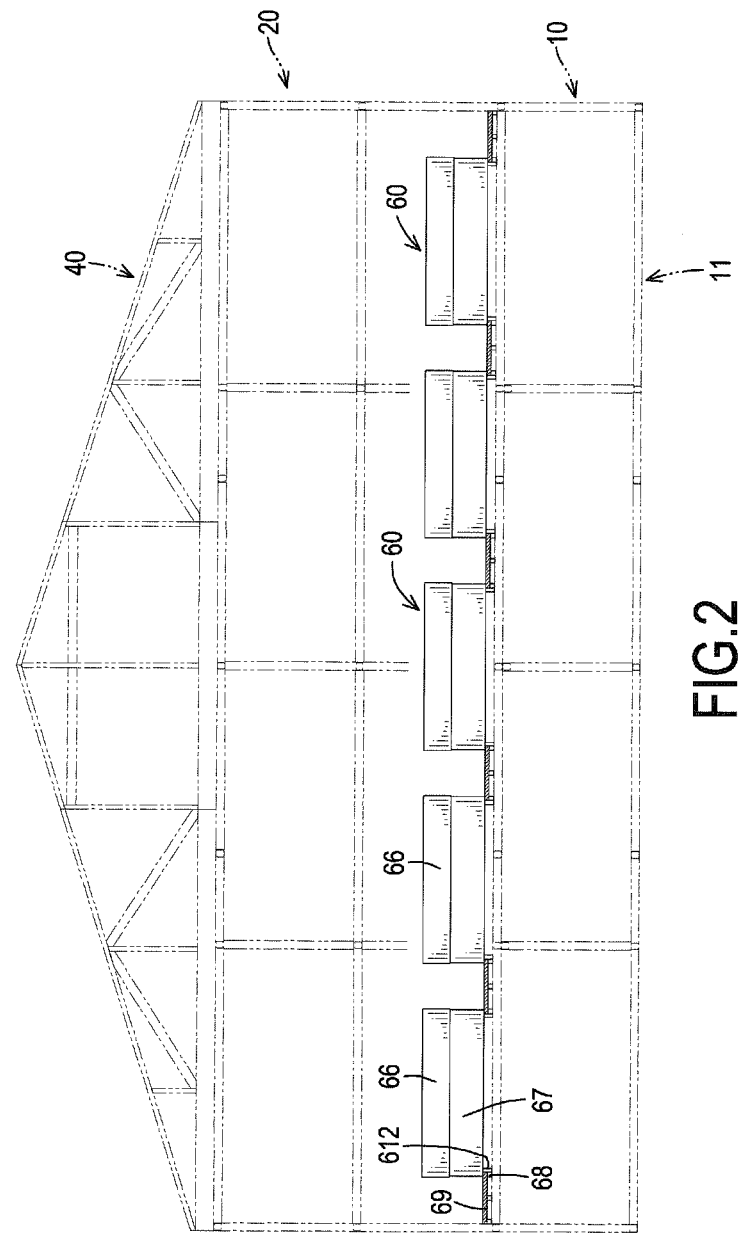
FIG. 2 is a side view in partial section of the combined greenhouse in FIG. 1.

With reference to FIGS. 1 and 2, a combined greenhouse in accordance with the present invention comprises a foundation bed 10, an outer wall assembly, a temperature control assembly 30, a roof, a solar energy device 50 and a plant bed.

Figure 3:
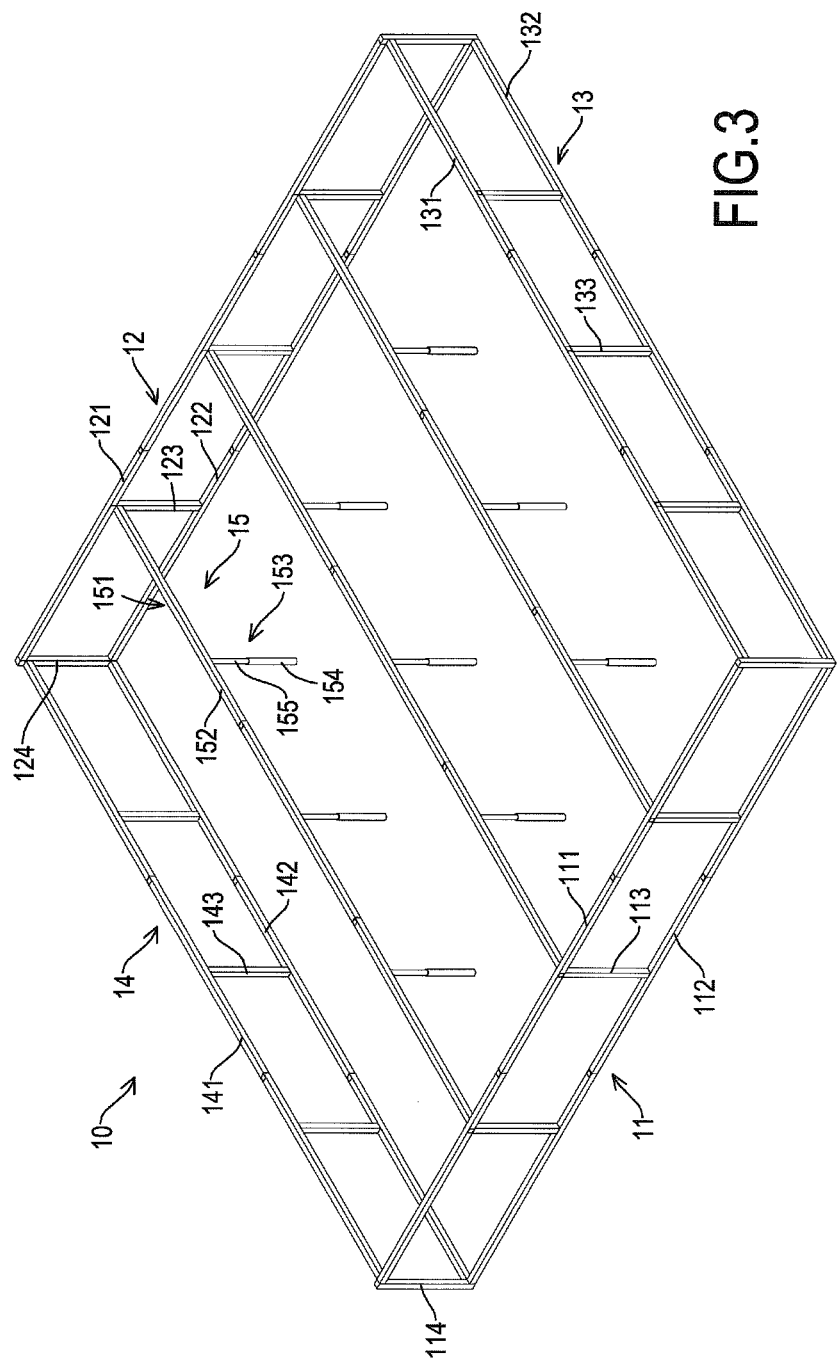
FIG. 3 is a perspective view of a foundation bed of the combined greenhouse in FIG. 1.
Figure 4:
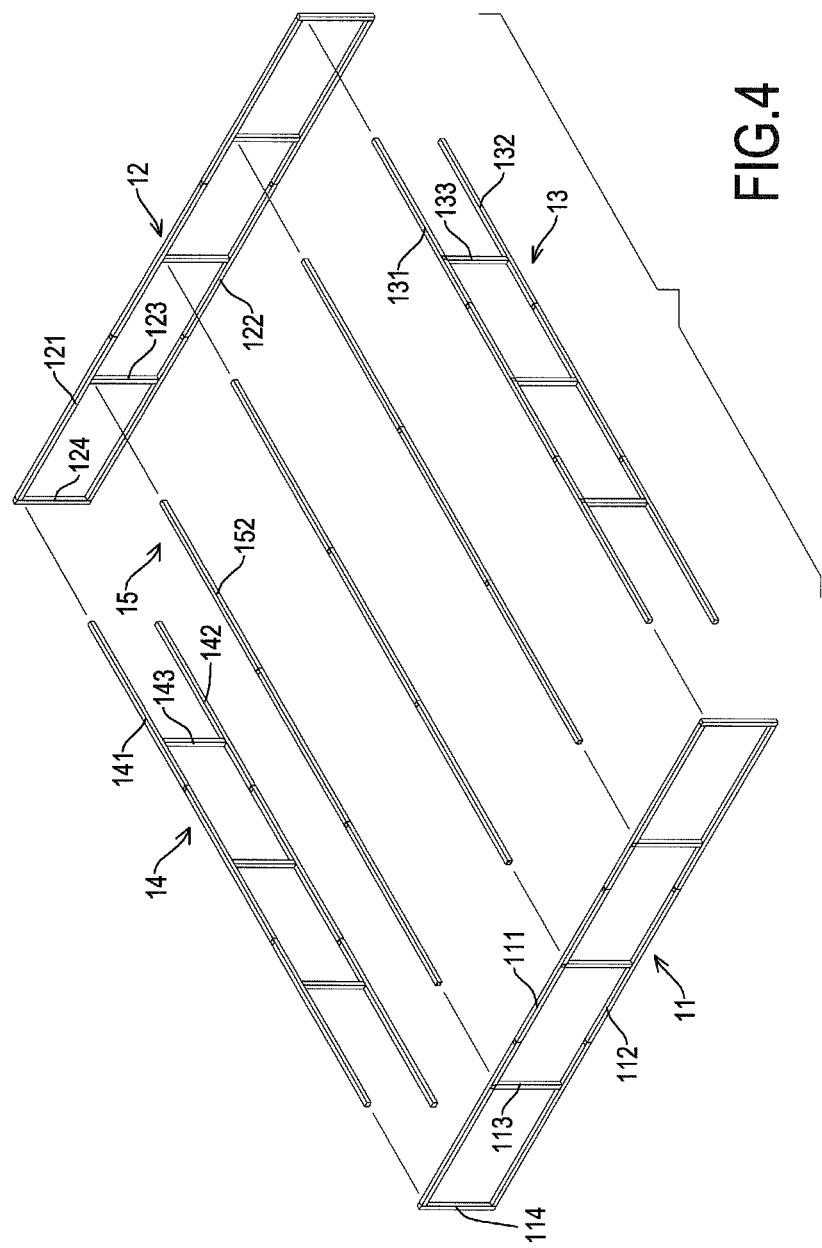
FIG. 4 is an exploded perspective view of the foundation bed in FIG. 3.

With reference to FIGS. 3 and 4, the foundation bed 10 has a front stand 11, a rear stand 12, two side stands 13, 14 and a reinforcing device 15. The front stand 11 has a bottom beam 112, multiple longitudinal studs 113, two side studs 114 and a top beam 111. The bottom beam 112 has a top face and two free ends. The longitudinal studs 113 are perpendicularly mounted on the top face of the bottom beam 112 at intervals between the free ends of the bottom beam 112. Each longitudinal stud 113 has an upper end. The side studs 114 are respectively connected to the free ends of the bottom beam 112 paralleling the longitudinal studs 113. The top beam 111 is connected to the studs 113, 114 above the bottom beam 112 and has a bottom face and two free ends. The bottom face of the top beam 111 is mounted on the upper ends of the longitudinal studs 113. The free ends of the top beam 111 are respectively connected to the side studs 114.

The rear stand 12 faces the front stand 11 and has a bottom beam 122, multiple longitudinal studs 123, two side studs 124 and a top beam 121. The bottom beam 122 has a top face and two free ends. The longitudinal studs 123 are perpendicularly mounted on the top face of the bottom beam 122 at intervals between the free ends of the bottom beam 122. Each longitudinal stud 123 has an upper end. The side studs 124 are respectively connected to the free ends of the bottom beam 122 paralleling the longitudinal studs 123. The top beam 121 is connected to the studs 123, 124 above the bottom beam 122 and has a bottom face and two free ends. The bottom face of the top beam 121 is mounted on the upper ends of the longitudinal studs 123. The free ends of the top beam 121 are respectively connected to the side studs 124.

The side stands 13, 14 are connected to the front stand 11 and the rear stand 12 and face to each other. Each side stand 13, 14 has a top beam 131, 141, a bottom beam 132, 142 and multiple longitudinal studs 133, 143. The beams 131, 141, 132, 142 are respectively connected to the side studs 114, 124 of the front stand 11 and the rear stand 12. The longitudinal studs 133, 143 are perpendicularly mounted between the beams 131, 141, 132, 142 at intervals between the side studs 114, 124 of the front stand 11 and the rear stand 12 to form multiple rooms between the beams 131, 141, 132, 142 and the studs 133, 143.

The reinforcing device 15 is connected to the front stand 11 and the rear stand 12 and has multiple reinforcing elements 151. The reinforcing elements 151 are connected between the front stand 11 and the rear stand 12 and each reinforcing element 151 has a supporting shaft 152 and multiple holding shafts 153. The supporting shaft 152 may be formed by multiple pipes, is connected between one of the longitudinal studs 113 of the front stand 11 and one of the longitudinal studs 123 of the rear stand 12 and has a bottom face. The holding shafts 153 are perpendicularly mounted on the bottom face of the supporting shaft 152 at intervals to enable the supporting shaft 152 to be held at a position near the top beams 111, 121 of the front stand 11 and the rear stand 12. In addition, each holding shaft 153 has an upper stud 155 and a lower stud 154. The upper stud 155 of the holding shaft 153 is mounted on the bottom face of the supporting shaft 152. The lower stud 154 is connected to the upper stud 155 to adjust the length of the holding shaft 153 and to hold the supporting shaft 152 horizontally.

With reference to FIGS. 1, 2, 5 and 6, the outer wall assembly is mounted on the foundation bed 10 and has four walls 20 and an outer frame 27. The walls 20 are respectively mounted on the frames 11, 12, 13, 14 of the foundation bed 10. Each wall 20 has a base frame 21, a transparent device 25 and multiple cover boards 26. The base frame 21 is mounted on one of the stands 11, 12, 13, 14 of the foundation bed 10 and has multiple longitudinal bars 23, 24 and multiple cross bars 22. The longitudinal bars 23, 24 are mounted on one of the top beams 111, 121, 131, 141 of the stands 11, 12, 13, 14 and align with the longitudinal studs 113, 123, 133, 143 of the corresponding stand 11, 12, 13, 14. The cross bars 22 are perpendicularly connected to the longitudinal bars 23, 24 to form multiple spaces between the bars 22, 23, 24, and parallel the beams 111, 112, 121, 122, 131, 132, 141, 142 of a corresponding stand 11, 12, 13, 14 of the foundation bed 10. Preferably, each cross bar 22 is made by multiple first pipes 221 and multiple second pipes 222.

The transparent device 25 is mounted on the base frame 21 and has multiple transparent boards 251. The transparent boards 251 may be made of glass or other transparent materials, are securely mounted in the spaces between the bars 22, 23, 24 of the base frame 21 to enable the sunshine to transmit into the combined greenhouse. The cover boards 26 are opaque and are mounted in the rooms of a corresponding stand 11, 12, 13, 14 of the foundation bed 10 between the beams 111, 112, 121, 122, 131, 132, 141, 142 and the studs 113, 114, 123, 124, 133, 134, 143, 144.

The outer frame 27 is mounted outside the wall 20 that is mounted on the front stand 11 of the foundation bed 10 and has an access door 271 and a staircase 272. The access door 271 is mounted outside the corresponding wall 20 and communicates with the combined greenhouse via the spaces of the corresponding wall 20. The staircase 272 is connected to the access door 271.

Figure 7:
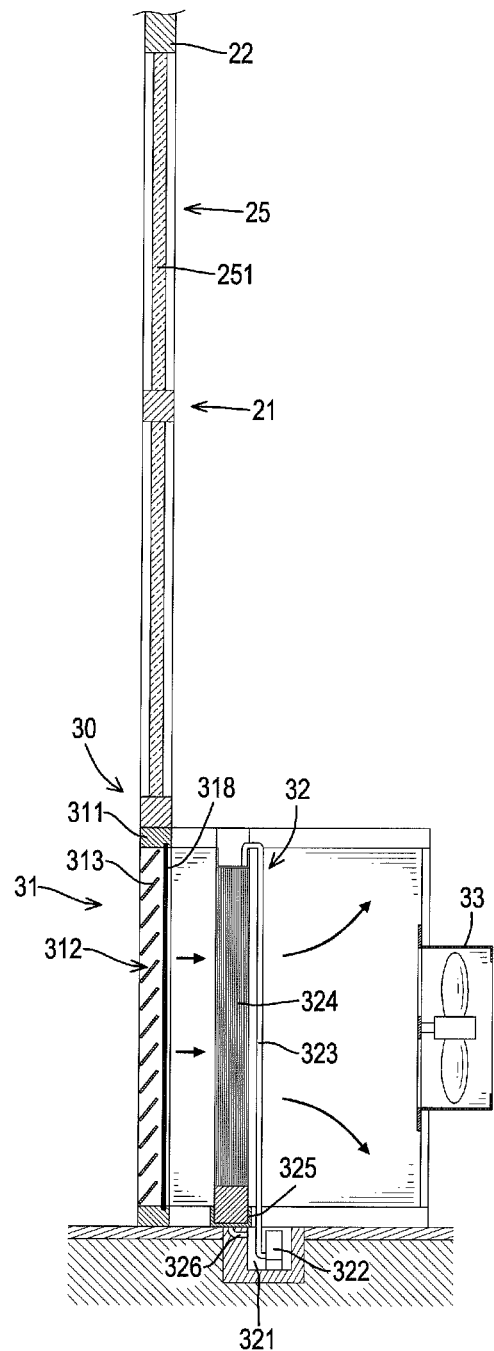
FIG. 7 is an enlarged side view in partial section of the temperature control assembly of the combined greenhouse in FIG. 6.

With reference to FIGS. 1, 7 and 8, the temperature control assembly 30 is mounted in one of the rooms of one of the side stands 13, 14 to replace one of the cover boards 26 of the corresponding wall 20 and has a ventilating device 31, a water-wall device 32 and an air-sucking device 33. The ventilating device 31 is mounted in the room of the corresponding side stand 13 between the beams 131, 132 and the studs 133 and has a main frame 311, at least one transom window 312, at least one driving module 314 and a mosquito-proof net 318. The main frame 311 is mounted in the room of the corresponding side stand 13. The at least one transom window 312 is mounted in the main frame 311 and has multiple blade boards 313. Preferably, the temperature control assembly 30 has two transom windows 312. The blade boards 313 are rotatably mounted in the main frame 311 and parallel each other. Each blade board 313 has a connecting end and a helical gear. The connecting end of the blade board 313 is mounted in the main frame 311 near one of the longitudinal studs 133 of the corresponding side stand 13. The helical gear is securely mounted on the connecting end of the blade board 313.

The at least one driving module 314 is mounted in the main frame 311 and is respectively connected to the at least one transom window 312. Each one of the at least one driving module 314 has a power unit 315, a driving shaft 316 and multiple transmitting units 317. The power unit 315 may be a gear motor, is mounted below the main frame 311 and has a top. In addition, the driving module 314 may have a controller connected to the power unit 315. The driving shaft 316 is rotatably connected to the top of the power unit 315 and extends upwardly near the helical gears of the blade boards 313 of one of the at least one transom window 312. The transmitting units 317 may be helical gears, are securely mounted around the driving shaft 316 at intervals and respectively engage the helical gears of the blade boards 313 of a corresponding transom window 312. When the driving shaft 316 is rotated by the power unit 315, the blade boards 313 will be rotated by the engagement between the helical gears of the blade boards 313 and the transmitting units 317. Then, the blade boards 313 of the at least one transom window 312 can be rotated relative to the main frame 311 to enable air to flow in an interior of the combined greenhouse. The mosquito-proof net 318 is mounted in the main frame 311 inside the at least one transom window 312.

The water-wall device 32 is mounted in the interior of the combined greenhouse inside the ventilating device 31 and has a reservoir 321, a suction pump 322, a connecting pipe 323, a curtain wall 324, a water tank 325 and a water pipe 326. The reservoir 321 is mounted in the ground inside the ventilating device 31 to store water. The suction pump 322 is mounted in the reservoir 321 to draw water out of the reservoir 321. The connecting pipe 323 is connected to the suction pump 322 to transport water out of the reservoir 321 via the suction pump 322 and extends upwardly out of the reservoir 321. The curtain wall 324 is mounted in the combined greenhouse between the main frame 311 and the connecting pipe 323 to receive water that is stored in the reservoir 321 via the suction pump 322 and the connecting pipe 323. The water tank 325 is mounted below the curtain wall 324 to receive water that is falling down from the curtain wall 324. The water pipe 326 is connected between the reservoir 321 and the water tank 325 to enable water to flow circularly to the reservoir 321.

The air-sucking device 33 is mounted in the combined greenhouse, is connected to the water-wall device 32 and is opposite to the ventilating device 31. The air-sucking device 33 has at least one suck fan to extract air into the interior of the combined greenhouse via the water-wall device 32 and the ventilating device 31. Preferably, the at least one suck fan of the air-sucking device 33 is connected to the controller of the driving module 314.

With reference to FIG. 7, when the at least one transom window 312 of the ventilating device 31 is opened, the curtain wall 324 of the water-wall device 32 receives water from the reservoir 321 and the at least one suck fan of the air-sucking device 33 is rotated, the outside air can be drawn to flow in the combined greenhouse via the blade boards 313, the mosquito-proof net 318 and the curtain wall 324. Furthermore, the angles of the blade boards 313 of the at least one transom window 312 can be adjusted according to the wind direction to enable the outside air to easily flow in the interior of the combined greenhouse. In addition, the air inside the interior of the combined greenhouse can be freshen and cooled by the mosquito-proof net 318 and the curtain wall 324. Then, when the sunshine transmits into the combined greenhouse via the transparent boards 251, the temperature control assembly 30 can be used to cool down and adjust the temperature of the interior of the combined greenhouse.

Figure 9:
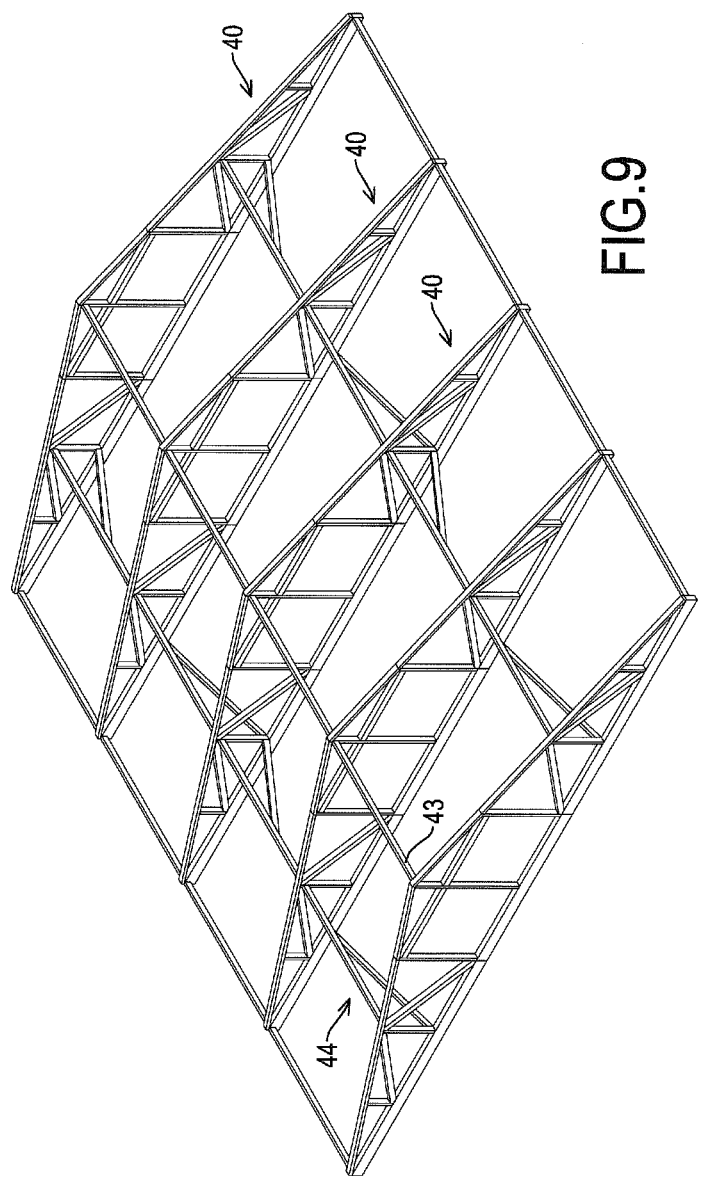
FIG. 9 is an enlarged perspective view of a roof of the combined greenhouse in FIG. 1.
Figure 10:
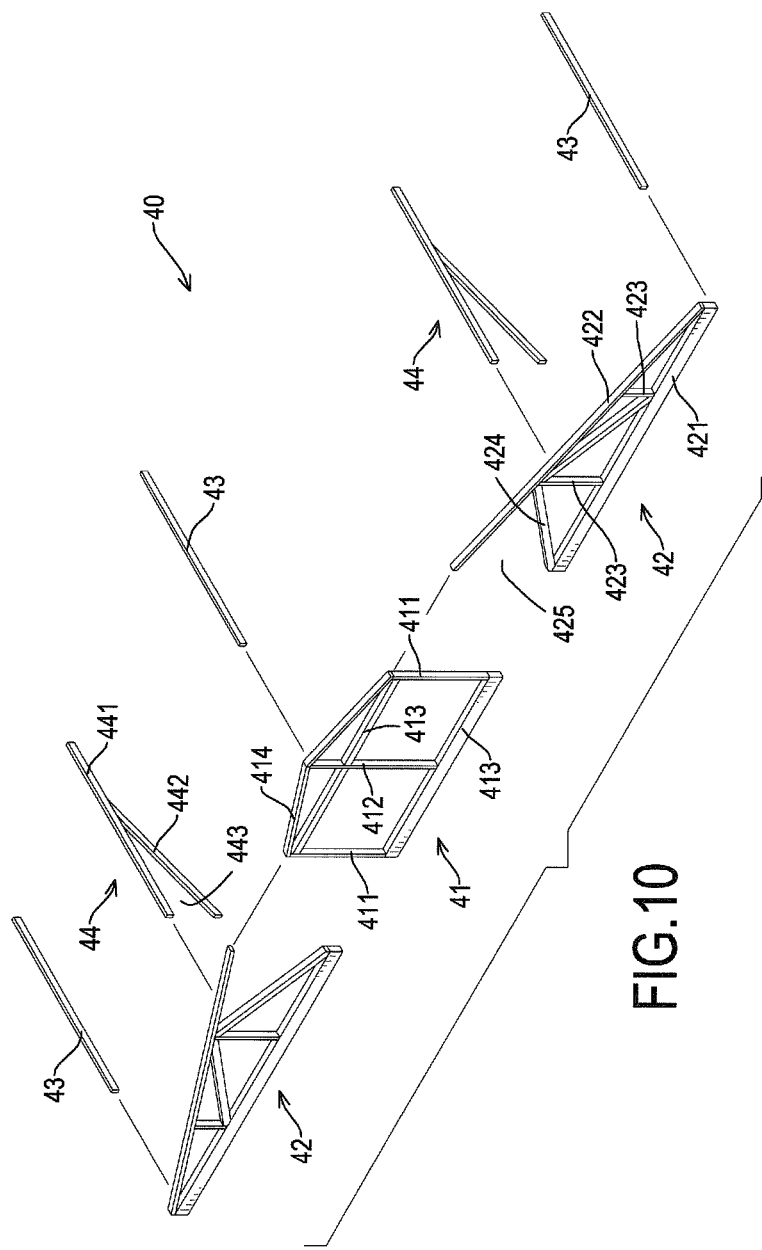
FIG. 10 is an exploded perspective view of the roof of the combined greenhouse in FIG. 9.

With reference to FIGS. 2, 9 and 10, the roof is mounted on the outer wall assembly above the foundation bed 10 and has multiple roof mounts 40, multiple main supporting struts 43 and multiple reinforcing frames 44. The roof mounts 40 are mounted on the walls 20 of the outer wall assembly at intervals. Each roof mount 40 has a main mount 41 and two side mounts 42. The main mount 41 has two side posts 411, two cross posts 413, a central post 412 and two oblique posts 414. The cross posts 413 are connected to the side posts 411 to form a rectangular frame. The central post 412 is connected to the cross posts 413 between the side posts 411 and has an upper end extending out of an uppermost cross post 413. The oblique posts 414 are connected to the upper end of the central post 412 and the uppermost cross post 413. Preferably, the posts 411, 412, 413, 414 of the main mount 41 are connected to each other by welding.

With reference to FIGS. 10 and 11, the side mounts 42 are symmetrically connected to the main mount 41. Each side mount 42 has a bottom bar 421, an oblique bar 422, two longitudinal supporting bars 423 and two oblique reinforcing bars 424. The bottom bar 421 is connected to a lowermost cross post 413 of the main mount 41. The oblique bar 422 is obliquely connected to the bottom bar 421, is connected to one of the oblique posts 414 of the main mount 41 to form a triangular space between the bottom bar 421 and the oblique bar 422 and has a free end 425 that is opposite to the bottom bar 421 and connected to a corresponding oblique post 414 of the main mount 41. The longitudinal supporting bars 423 are connected between the bottom bar 421 and the oblique bar 422 at intervals. The oblique reinforcing bars 424 are obliquely connected between the bottom bar 421, the oblique bar 422 and the longitudinal supporting bars 423. Preferably, the bars 421, 422, 423, 424 are connected to each other by welding and the side mounts 42 are connected to the main mount 41 by welding.

With reference to FIGS. 9 and 10, the main supporting struts 43 may be quadrate or circular in cross section, and are connected to the main mounts 41 and the side mounts 42 of the roof mounts 40. The reinforcing frames 44 are connected to the roof mounts 40 between the main supporting struts 43. Each reinforcing frame 44 has a cross strut 441 and an oblique strut 442. The cross strut 441 is connected between two of the longitudinal supporting bars 423 of two adjacent side mounts 42. The oblique strut 442 is connected to the cross strut 441 and has a free end 443 connected to one of the corresponding longitudinal supporting bar 423 that is connected to the cross strut 441. The reinforcing bars 423, 424 of the side mounts 42 and the struts 441, 442 of the reinforcing frames 44 can be used to increase the structural strength of the roof of the combined greenhouse.

With reference to FIGS. 1 and 11, the solar energy device 50 is mounted on the roof to increase the effect of air cycling and has multiple mounting panels 54, a ventilating room 51 and two ventilators 53. The mounting panels 54 may be solar panels and are mounted on the roof mounts 40. The ventilating room 51 is mounted on the mounting panels 54, communicates with the interior of the combined greenhouse and has two outer sides, multiple mounting braces 511, multiple connecting braces 512 and multiple coverings 52. The mounting braces 511 are mounted on the mounting panels 54 and protrude upwardly. Each mounting brace 511 has a top end. The connecting braces 512 are connected to the top ends of the mounting braces 511 and are connected to each other to form multiple spaces between the braces 511, 512. The coverings 52 are mounted in the spaces between the braces 511, 512.

With reference to FIGS. 12 and 13, the ventilators 53 are respectively mounted in the outer sides of the ventilating room 51 and communicate with the interior of the combined greenhouse. Each ventilator 53 has a mounting frame 531, at least one transom window 532, at least one driving module 534 and a strainer 538. The mounting frame 531 is mounted in one of the spaces of the ventilating room 51. The at least one transom window 532 is mounted in the mounting frame 531 and has multiple blade boards 533. Preferably, each ventilator 53 has two transom windows 532. The blade boards 533 are rotatably mounted in the mounting frame 531 and parallel each other. Each blade board 533 has a connecting end and a helical gear. The connecting end of the blade board 533 is mounted in the mounting frame 531 near one of the mounting braces 511 of the ventilating room 51. The helical gear is securely mounted on the connecting end of the blade board 533.

The at least one driving module 534 is mounted in the mounting frame 531 and is respectively connected to the at least one transom window 532. Each one of the at least one driving module 534 has a power unit 535, a driving shaft 536 and multiple transmitting units 537. The power unit 535 may be a gear motor, is mounted below the mounting frame 531 and has a top. In addition, the driving module 534 may have a controller connected to the power unit 535. The driving shaft 536 is rotatably connected to the top of the power unit 535 and extends upwardly near the helical gears of the blade boards 533 of one of the at least one transom window 532. The transmitting units 537 may be helical gears, are securely mounted around the driving shaft 536 at intervals and respectively engage the helical gears of the blade boards 533 of a corresponding transom window 532. When the driving shaft 536 is rotated by the power unit 535, the blade boards 533 will be rotated by the engagement between the helical gears of the blade boards 533 and the transmitting units 537. Then, the blade boards 533 of the at least one transom window 532 can be rotated relative to the mounting frame 531 to enable air to flow in the interior of the combined greenhouse. The strainer 538 is mounted in the mounting frame 531 inside the at least one transom window 532.

Figure 14:
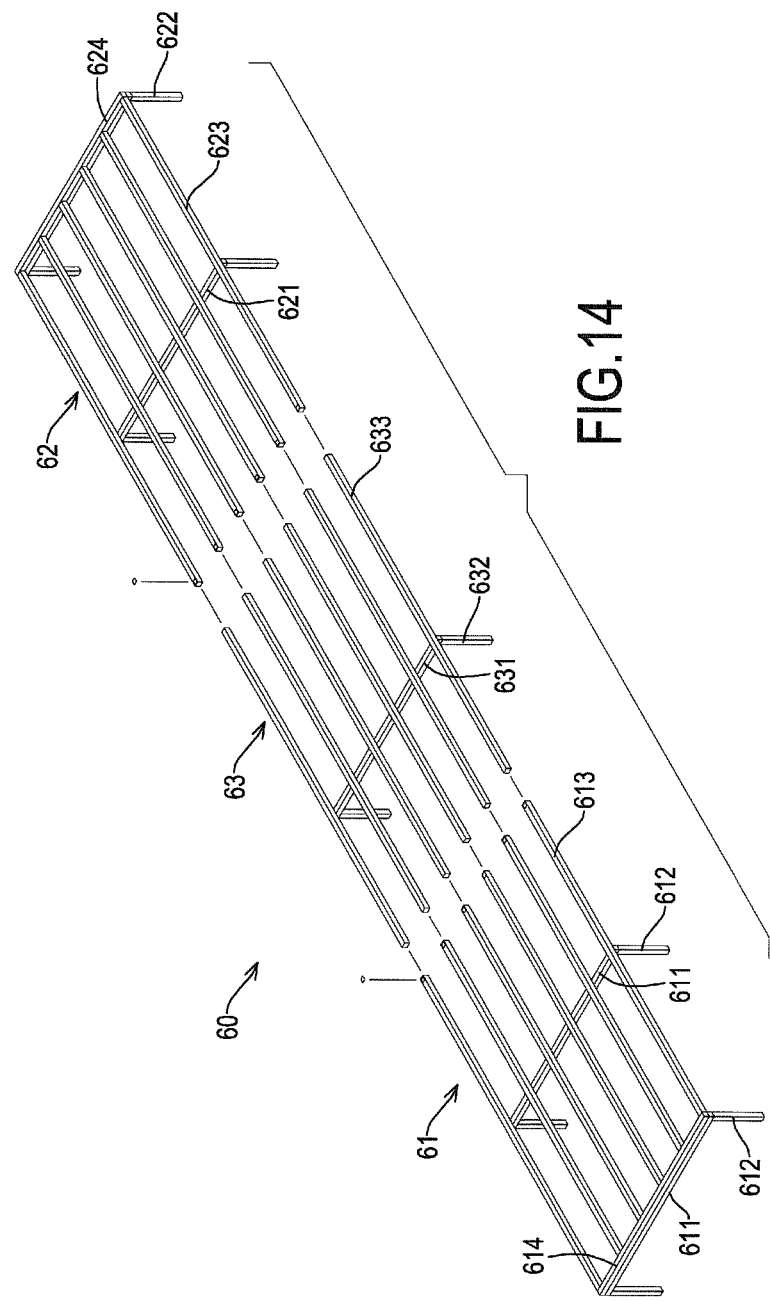
FIG. 14 is an enlarged and exploded perspective view of a plant frame of the combined greenhouse in FIG. 2.
Figure 15:
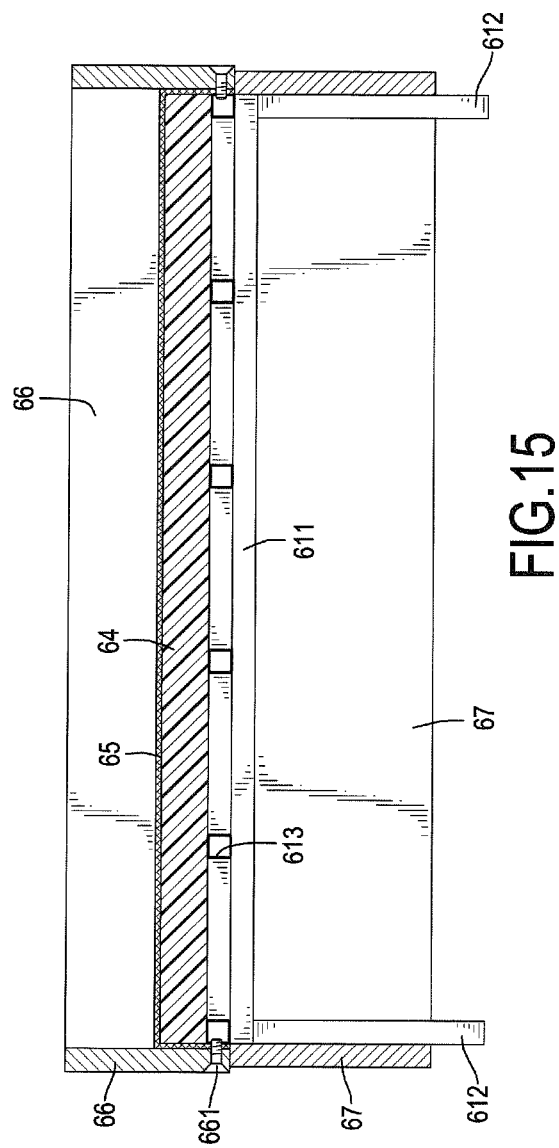
FIG. 15 is an enlarged side view in partial section of the plant frame of the combined greenhouse in FIG. 2.

With reference to FIGS. 2, 14 and 15, the plant bed is mounted on the foundation bed 10 between the walls 20 and has multiple plant frames 60, multiple supporting arms 68 and multiple floor boards 69.

The plant frames 60 are mounted on the reinforcing device 15 of the foundation bed 10 and each plant frame 60 has two end frames 61, 62, at least one linking frame 63, a baseboard 64, a plant net 65, multiple upper resisting boards 66 and multiple lower resisting boards 67. Each end frame 61, 62 has multiple mounting arms 612, 622, two linking arms 611, 621, multiple holding arms 613, 623 and an end arm 614, 624. The mounting arms 612, 622 of the end frames 61, 62 are securely mounted on the supporting shafts 152 of the reinforcing device 15. Each mounting arm 612, 622 has a top end and a length. Each linking arm 611, 621 is connected to the top ends of two of the mounting arms 612, 622 and has a length. The holding arms 613, 623 are mounted on the linking arms 611, 621 at intervals. Each holding arm 613, 623 has an outer end and an inner end. The outer ends of the holding arms 613, 623 are mounted on one of the linking arms 611, 621. The inner ends of the holding arms 613, 623 are exceed out of the other linking arm 611, 621. The end arm 614, 624 is mounted on the outer ends of the holding arms 613, 623.

The at least one linking frame 63 is connected to the end frames 61, 62. Each one of the at least one linking frame 63 has two mounting arms 632, a linking arm 631 and multiple holding arms 633. The mounting arms 632 are securely mounted on the supporting shafts 152 of the reinforcing device 15 and align with the mounting arms 612, 622 of the end frames 61, 62. Each mounting arm 612, 622 has a top end and a length. The lengths of the mounting arms 632 are same as the lengths of the mounting arms 612, 622 of the end frames 61, 62. The linking arm 631 is connected to the mounting arms 632, parallels the linking arms 611, 621 of the end frames 61, 62 and has a length and a top face. The length of the linking arm 631 is same as the lengths of the linking arms 611, 621 of the end frames 61, 62. The holding arms 633 are mounted on the top face of the linking arm 631 at intervals and are respectively connected to inner ends of the holding arms 613, 623 of the end frames 61, 62.

With reference to FIG. 15, the baseboard 64 may be made of plastic materials and is mounted on the holding arms 613, 623, 633 of the end frames 61, 62 and the at least one linking frame 63. The plant net 65 is mounted around the baseboard 64. The upper resisting boards 66 are connected to the outermost holding arms 613, 623, 633 of the end frames 61, 62 and the at least one linking frame 63 and the outermost linking arms 611, 621 of the ends frames 61, 62 to mount around the plant net 65 and the baseboard 64. Each upper resisting board 66 has multiple fasteners 661 to connect to a corresponding outermost holding arm 613, 623, 633 of the end frames 61, 62 and the at least one linking frame 63 or a corresponding outermost linking arms 611, 621 of the ends frames 61, 62. The lower resisting boards 67 are securely connected to the end frames 61, 62 and the at least one linking frame 63 below the upper resisting boards 66 to mount around the mounting arms 612, 622, 632 of the end frames 61, 62 and the at least one linking frame 63. Each lower resisting board 67 has a length smaller than the length of each one of the mounting arms 612, 622, 632 of the end frame 61, 62 and the at least one linking frame 63.

Figure 16:
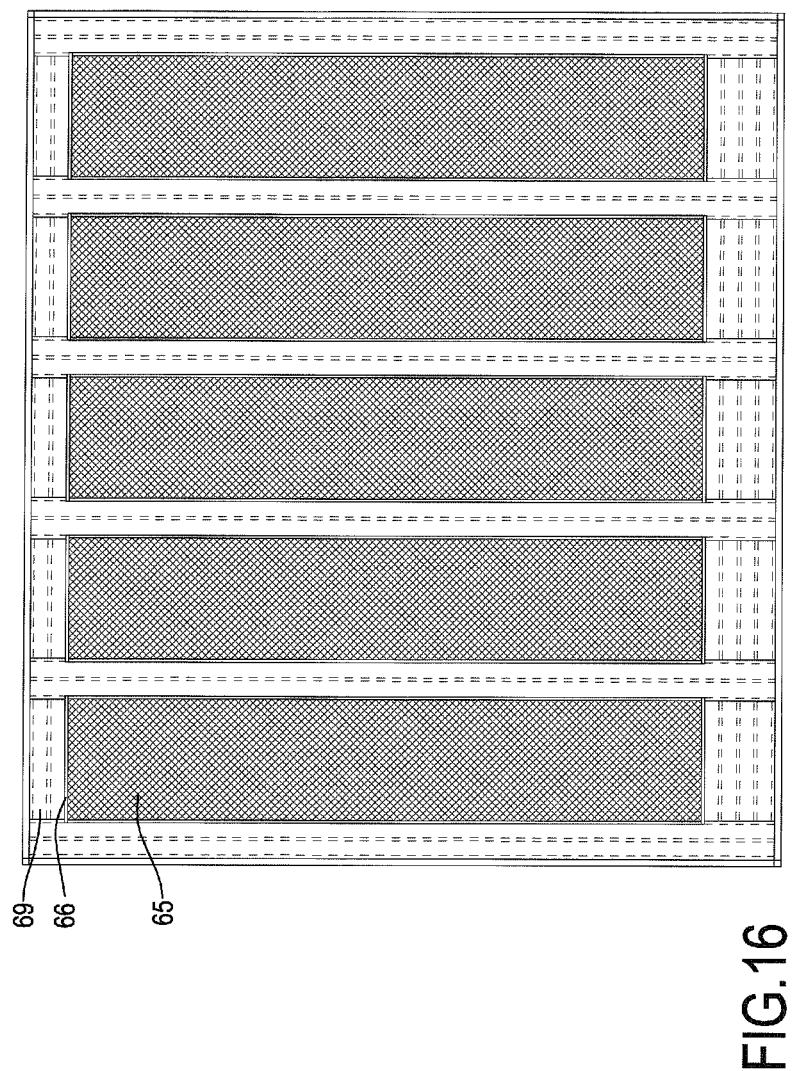
FIG. 16 is a top view of a plant bed of the combined greenhouse in FIG. 1.

With reference to FIGS. 2 and 16, the plant bed may have five plant frames 60 mounted on the foundation bed 10 at intervals. The supporting arms 68 are mounted on the supporting shafts 152 of the reinforcing device 15 at intervals between the mounting arms 612, 622, 632 of the end frames 61, 62 and the at least one linking frame 63 of the plant frames 60 below the lower resisting boards 67 of the plant frames 60. The floor boards 69 are mounted on the supporting arms 68 around the plant frames 60 to enable a user to walk around the plant frames 60 in the combined greenhouse.

Figure 17:
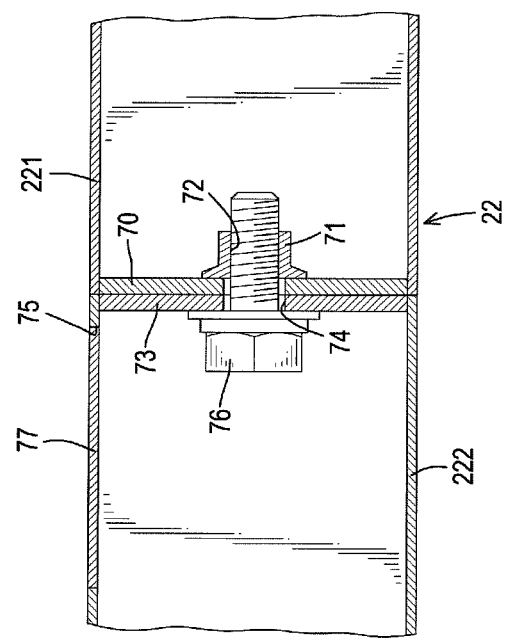
FIG. 17 is an enlarged side view in partial section of the wall of the combined greenhouse along line 17-17 in FIG. 5.

The combined greenhouse in accordance with the present invention has multiple connecting types to connect the foundation bed 10, the outer wall assembly, the temperature control assembly 30, the roof, the solar energy device 50 and the plant bed. In the first connecting type, for example, with reference to FIGS. 5 and 17, a fixing board 70 is securely mounted in one of the fist pipes 221 of the cross bars 22 and has an inner side and at least one fastening segment 71. The at least one fastening segment 71 is formed on and protrudes from the inner side of the fixing board 70 and has a threaded hole 72 formed through the fixing board 70 and the fastening segment 71. A positioning board 73 is securely mounted in a second pipe 222 of the cross bar 22 that is connected to the first pipe 221, faces and abuts the fixing board 70 and has an opening hole 75, at least one through hole 74, at least one screw bolt 76 and a sealing board 77. The opening hole 75 is formed through a top face of the second pipe 222. The at least one through hole 74 is formed through the positioning board 73 and aligns with the threaded hole 72 of the at least one fastening segment 71. The at least one screw bolt 76 is mounted in the second pipe 222 via the opening hole 75, is mounted through the at least one through hole 74 of the positioning board 73 and is screwed in the threaded hole 72 of the at least one fastening segment 71 of the fixing board 71 to connect the second pipe 222 to the first pipe 221. After the pipes 221, 222 are connected to each other, the sealing board 77 is securely mounted in the opening hole 75 to cover the at least one screw bolt 76.

Figure 5:
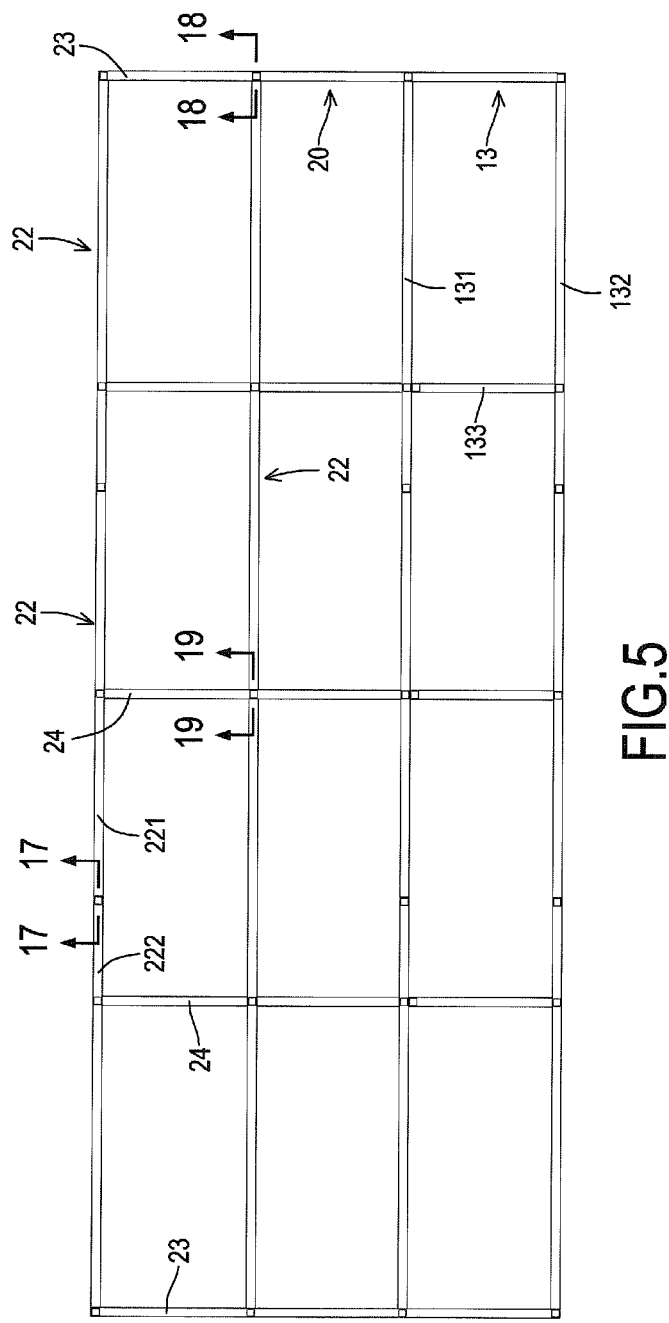
FIG. 5 is an enlarged side view of a side stand and a wall of the combined greenhouse in FIG. 1.
Figure 6:
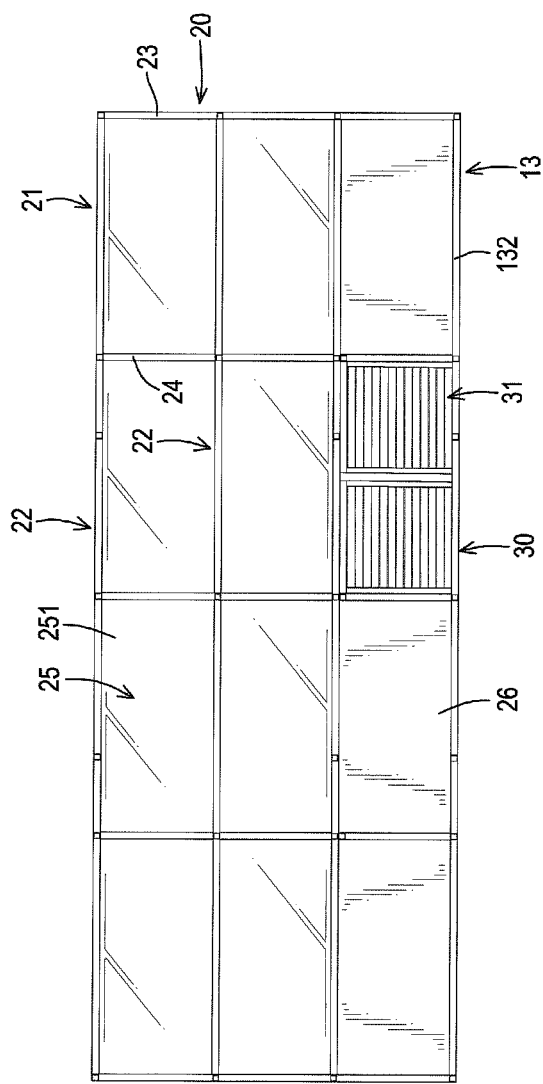
FIG. 6 is an enlarged side view of a side stand, a wall and a temperature control assembly of the combined greenhouse in FIG. 1.
Figure 18:
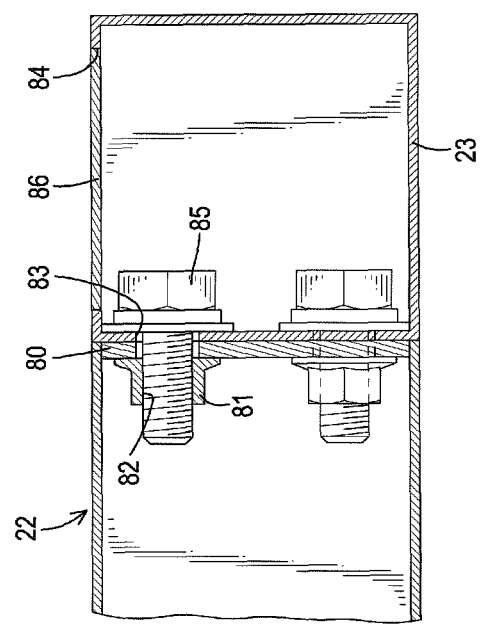
FIG. 18 is an enlarged side view in partial section of the wall of the combined greenhouse along line 18-18 in FIG. 5.

With reference to FIGS. 5 and 18, in the second connecting type, a fixing board 80 is securely mounted in one of the cross bars 22 and has an inner side and multiple fastening segments 81. The fastening segments 81 are formed on and protrude from the inner side of the fixing board 80 at intervals and each fastening segment 81 has a threaded hole 82 formed through the fixing board 80 and the fastening segment 81. A side face of the longitudinal bar 23 that is connected to the corresponding cross bar 22 faces and abuts the fixing board 80 and has an opening hole 84, multiple through holes 83, multiple screw bolts 85 and a sealing board 86. The opening hole 84 is formed through a top face of the longitudinal bar 23. The through holes 83 are formed through the side face of the longitudinal bar 23 and align with the threaded holes 82 of the fastening segments 81. The screw bolts 85 are mounted in the longitudinal bar 23 via the opening hole 84, are respectively mounted through the through holes 83 of the longitudinal bar 23 and are screwed in the threaded holes 82 of the fastening segments 81 of the fixing board 80 to connect the longitudinal bar 23 to the cross bar 22. After the bars 22, 23 are connected to each other, the sealing board 86 is securely mounted in the opening hole 84 to cover the screw bolts 85.

In the third connecting type, with reference to FIGS. 5 and 19, the connection between one of the longitudinal bars 24 and two adjacent cross bars 22, two fixing boards 90 are respectively and securely mounted in the adjacent cross bars 22 and each fixing board 90 has an inner side and multiple fastening segments 91. The fastening segments 91 are formed on and protrude from the inner side of the fixing board 90 at intervals and each fastening segment 91 has a threaded hole 92 formed through the fixing board 90 and the fastening segment 91. The longitudinal bar 24 that is connected to the adjacent cross bars 22 has two side faces, a top face, an opening hole 94 and a sealing board 96. The side faces of the longitudinal bar 24 respectively face and abut the fixing boards 90 and each side face has multiple through holes 93 and multiple screw bolts 95. The through holes 93 are formed through the side face of the longitudinal bar 24 and align with the threaded holes 92 of the fastening segments 91 of a corresponding fixing board 90. The screw bolts 95 are mounted in the longitudinal bar 24, are respectively mounted through the through holes 93 of the longitudinal bar 24 and are screwed in the threaded holes 92 of the fastening segments 91 of the corresponding fixing board 90 to connect the longitudinal bar 24 to the corresponding cross bar 22. The opening hole 94 is formed through the top face of the longitudinal bar 24 to enable the screw bolts 95 to mount between the bars 22, 24. After the bars 22, 24 are connected to each other, the sealing board 96 is securely mounted in the opening hole 94 to cover the screw bolts 95.

In use, the foundation bed 10, the outer wall assembly, the roof and the plant bed of the combined greenhouse in accordance with the present invention can be assembled separately, and can be transported to the destination separately and then connected to each other to form the combined greenhouse quickly and easily. In addition, the transparent device 25 of the outer wall assembly can enable the sunshine to transmit into the combined greenhouse amply. The ventilating device 31 of the temperature control assembly 30 can be used to enable air to flow in the combined greenhouse to lower the temperature of the combined greenhouse and hot air in the combined greenhouse can be flowed out of the combined greenhouse by the ventilators 53 that are mounted on the roof. Then, the temperature of the combined greenhouse can be adjusted by the ventilating device 31 of the temperature control assembly 30 and the ventilators 53 conveniently.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A combined greenhouse having
an interior;
a foundation bed having
  a front stand being made by multiple beams and multiple studs;
  a rear stand facing the front stand and being made by multiple beams and multiple studs;
  two side stands connected to the front stand and the rear stand and facing to each other, and each side stand being made by multiple beams and multiple studs; and
  a reinforcing device connected to the front stand and the rear stand and having
    multiple reinforcing elements connected between the front stand and the rear stand and each reinforcing element having
      a supporting shaft connected between one of the studs of the front stand and one of the studs of the rear stand and having a bottom face; and
      multiple holding shafts perpendicularly mounted on the bottom face of the supporting shaft at intervals;
an outer wall assembly mounted on the foundation bed and having
  four walls respectively mounted on the stands of the foundation bed, and each wall having
    a base frame mounted on one of the stands of the foundation bed and having
      multiple longitudinal bars mounted on one of the beams of a corresponding stand of the foundation bed and aligning with the studs of the corresponding stand; and
      multiple cross bars perpendicularly connected to the longitudinal bars to form multiple spaces between the bars, and paralleling the beams of the corresponding stand of the foundation bed; and
    a transparent device mounted on the base frame and having multiple transparent boards securely mounted in the spaces between the bars of the base frame to enable the sunshine to transmit into the interior of the combined greenhouse; and
  an outer frame mounted outside the wall that is mounted on the front stand of the foundation bed and having
    an access door mounted outside the corresponding wall and communicating with the interior of the combined greenhouse via the spaces of the corresponding wall; and
    a staircase connected to the access door;
a temperature control assembly mounted in one of the side stands and having
  a ventilating device mounted in the corresponding side stand and having
    a main frame mounted in the corresponding side stand between the beams and the studs of the corresponding side stand;
    at least one transom window mounted in the main frame and having multiple blade boards rotatably mounted in the main frame; and
    a mosquito-proof net mounted in the main frame inside the at least one transom window;
  a water-wall device mounted in the interior of the combined greenhouse inside the ventilating device and having
    a reservoir being adapted to mount in inside the ventilating device to store water;
    a suction pump mounted in the reservoir to draw water out of the reservoir;
    a connecting pipe connected to the suction pump to transport water out of the reservoir via the suction pump and extending upwardly out of the reservoir; and
    a curtain wall mounted in the combined greenhouse between the main frame and the connecting pipe to receive water that is stored in the reservoir via the suction pump and the connecting pipe; and
  an air-sucking device mounted in the interior of the combined greenhouse, connected to the water-wall device and being opposite to the ventilating device and having at least one suck fan to suck air into the interior of the combined greenhouse via the water-wall device and the ventilating device;
a roof mounted on the outer wall assembly above the foundation bed and having
  multiple roof mounts mounted on the walls of the outer wall assembly at intervals and each roof mount having a main mount being made by multiple posts; and
two side mounts symmetrically connected to the main mount;
multiple main supporting struts connected to the main mounts and the side mounts of the roof mounts; and
multiple reinforcing frames connected to the roof mounts between the main supporting struts; and
a plant bed mounted on the foundation bed between the walls of the outer wall assembly and having
multiple plant frames mounted on the reinforcing device of the foundation bed and each plant frame having
two end frames;
at least one linking frame connected between the end frames;
a baseboard mounted on the end frames and the at least one linking frame;
a plant net mounted around the baseboard;
multiple upper resisting boards connected to the end frames and the at least one linking frame to mount around the plant net and the baseboard; and
multiple lower resisting boards securely connected to the end frames and the at least one linking frame below the upper resisting boards.

2. The combined greenhouse as claimed in claim 1, wherein each holding shaft has
a length;
an upper stud mounted on the bottom face of a corresponding supporting shaft; and
a lower stud connected to the upper stud to adjust the length of the holding shaft.

3. The combined greenhouse as claimed in claim 2, wherein the ventilating device of the temperature control assembly has at least one driving module mounted in the main frame and respectively connected to the at least one transom window, and each one of the at least one driving module has
a power unit mounted below the main frame and having a top;
a driving shaft rotatably connected to the top of the power unit and extending upwardly near the blade boards of one of the at least one transom window; and
multiple transmitting units securely mounted around the driving shaft at intervals and respectively engaging the blade boards of a corresponding transom window to enable the blade boards to rotate relative to the main frame of the ventilating device.

4. The combined greenhouse as claimed in claim 1 further comprising
a ventilating room mounted on the roof, communicating with the interior of the combined greenhouse and having two outer sides; and
two ventilators respectively mounted in the outer sides of the ventilating room and communicating with the interior of the combined greenhouse, and each ventilator has
a mounting frame mounted in the ventilating room;
at least one transom window mounted in the mounting frame and having multiple blade boards rotatably mounted in the mounting frame; and
a strainer mounted in the mounting frame inside the at least one transom window.

5. The combined greenhouse as claimed in claim 4, wherein each ventilator has at least one driving module mounted in the mounting frame and respectively connected to the at least one transom window, and each one of the at least one driving module has
a power unit mounted below the mounting frame and having a top;
a driving shaft rotatably connected to the top of the power unit and extending upwardly near the blade boards of one of the at least one transom window; and
multiple transmitting units securely mounted around the driving shaft at intervals and respectively engaging the blade board of a corresponding transom window to enable the blade boards to rotate relative to the mounting frame.

6. The combined greenhouse as claimed in claim 3, wherein further comprising
a ventilating room mounted on the roof, communicating with the interior of the combined greenhouse and having two outer sides; and
two ventilators respectively mounted in the outer sides of the ventilating room and communicating with the interior of the combined greenhouse, and each ventilator has
a mounting frame mounted in the ventilating room;
at least one transom window mounted in the mounting frame and having multiple blade boards rotatably mounted in the mounting frame; and
a strainer mounted in the mounting frame inside the at least one transom window.

7. The combined greenhouse as claimed in claim 6, wherein each ventilator has at least one driving module mounted in the mounting frame and respectively connected to the at least one transom window, and each one of the at least one driving module has
a power unit mounted below the mounting frame and having a top;
a driving shaft rotatably connected to the top of the power unit and extending upwardly near the blade boards of one of the at least one transom window; and
multiple transmitting units securely mounted around the driving shaft at intervals and respectively engaging the blade board of a corresponding transom window to enable the blade boards to rotate relative to the mounting frame.

8. The combined greenhouse as claimed in claim 1, wherein the ventilating device of the temperature control assembly has at least one driving module mounted in the main frame and connected to the at least one transom window, and each one of the at least one driving module has
a power unit mounted below the main frame and having a top;
a driving shaft rotatably connected to the top of the power unit and extending upwardly near the blade boards of one of the at least one transom window; and
multiple transmitting units securely mounted around the driving shaft at intervals and respectively engaging the blade boards of a corresponding transom window to enable the blade boards to rotate relative to the main frame of the ventilating device.

* * * * *